May 31, 1927.
L. W. BUGBEE
1,630,253
MACHINE FOR GRINDING LENSES
Filed Oct. 6, 1924
2 Sheets-Sheet 1
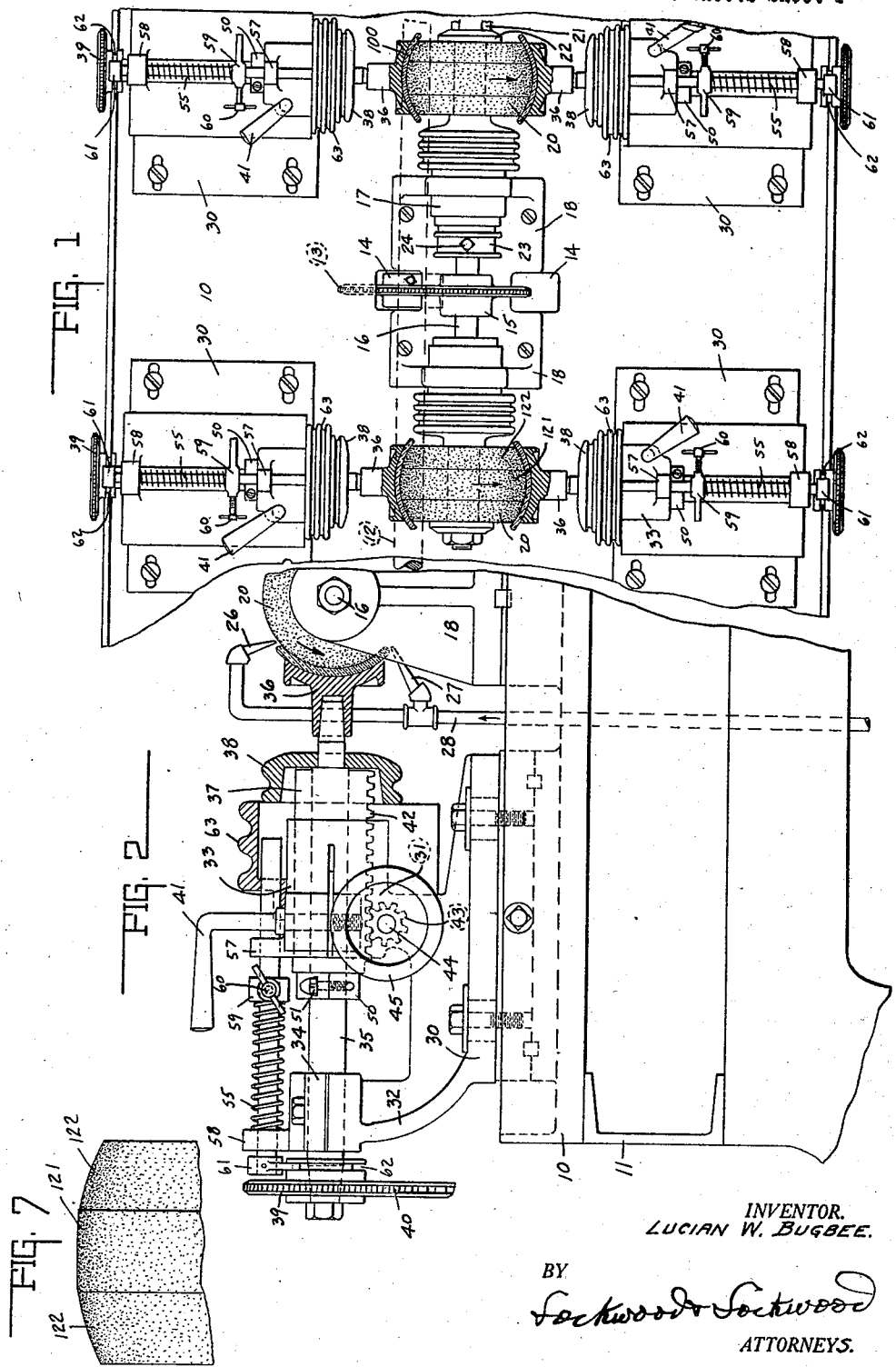
INVENTOR.
LUCIAN W. BUGBEE.
BY
Lockwood & Lockwood
ATTORNEYS.

May 31, 1927.
L. W. BUGBEE
1,630,253
MACHINE FOR GRINDING LENSES
Filed Oct. 6, 1924
2 Sheets-Sheet 2
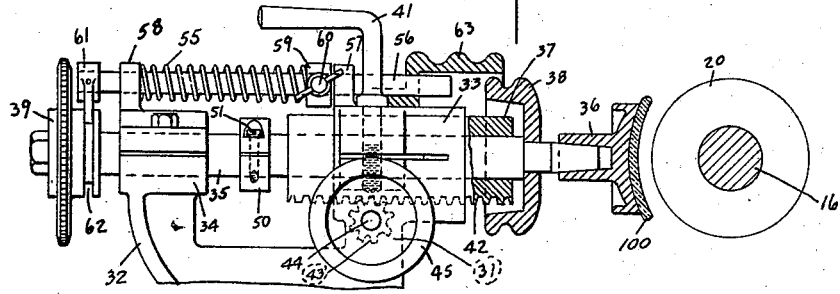
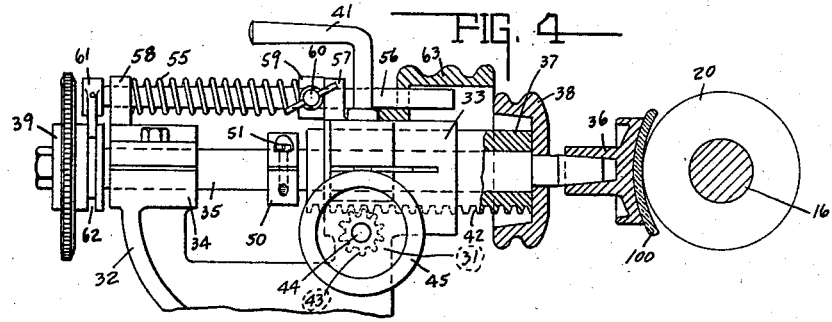
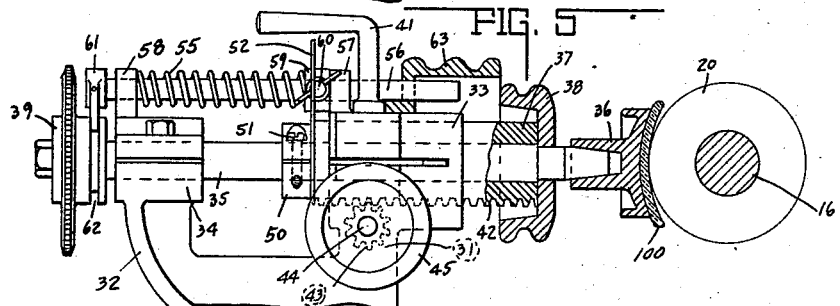
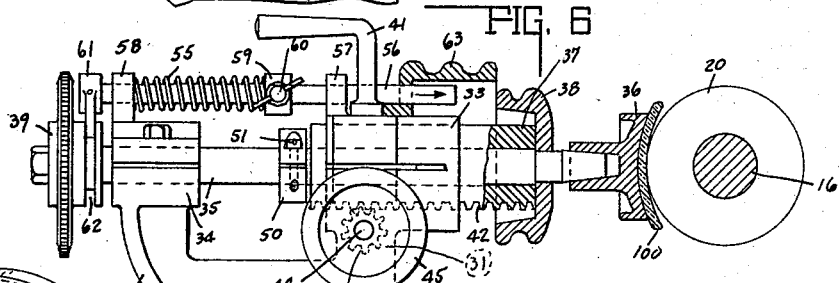
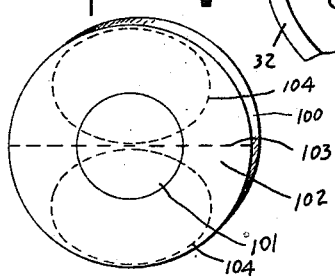
INVENTOR.
LUCIAN W. BUGBEE.
BY
Lockwood & Lockwood
ATTORNEYS.

Patented May 31, 1927.

1,630,253

UNITED STATES PATENT OFFICE.

LUCIAN W. BUGBEE, OF INDIANAPOLIS, INDIANA, ASSIGNOR, BY MESNE ASSIGNMENTS, TO CONTINENTAL OPTICAL CORPORATION, OF NEW YORK, N. Y., A CORPORATION OF DELAWARE.

MACHINE FOR GRINDING LENSES.

Application filed October 6, 1924. Serial No. 742,000.

This machine is for generating the bifocal surfaces of bifocal lens blanks of a target form, by the line grinding process; and it is an improvement over the apparatus set forth in applicant's former application for a bifocal lens grinding machine, Serial No. 689,237, filed January 29, 1924.

One new feature of this improved machine consists in providing a positive stop adjustably mounted on the spindle which carries the lens holding block for engaging a part of the apparatus, which is fixed during the grinding operation, for limiting the feeding movement of the lens holder towards the grinder.

Another feature of this invention consists in mounting the lens holding spindle in a bearing sleeve which is longitudinally adjustable with reference both to the spindle and to the frame of the apparatus, and means for clamping it in adjusted position, and means for conveniently moving said sleeve longitudinally, whereby the lens holding spindle may be retracted for the purpose of removing and replacing the lens block on the spindle. Along with said sleeve there is the provision of a collar secured on the spindle near the inner end thereof adapted to be engaged by the sleeve; and a positive stop mounted on the spindle in position to engage said sleeve and automatically stop the grinding of the lens when it has been sufficiently ground.

Another feature of the invention consists in the means for giving the lens holding spindle its feeding movement, consisting of a rod parallel with the spindle and longitudinally movable with means at one end in engagement with the spindle, whereby it can move the spindle, and a spring on said rod tending to move it towards the grinder, which will cause the rod to give the lens holding spindle a yielding feeding movement, and a stop collar on said rod for adjusting the tension of the spring and for releasing the spring when it is desired to replace the lens holding block or adjust the lens holding mechanism.

Another feature of the invention consists in a gauge plate insertable between the positive stop on the lens holding spindle and a stationary part of the means in which the spindle is mounted, for properly adjusting the stop so as to cause the apparatus to stop the grinding of the lens blank when the desired thickness of glass has been ground thereon.

Another feature of the invention consists in the arrangement of said lens holding means on opposite sides of the rotary grinder so that a plurality of lens blanks can be ground at the same time, the lens holding means having no movement during the grinding operation excepting a rotary movement and the longitudinal feeding movement, whereby the two opposite lens holding means will counteract each other and all chance for undesirable movement of the lens holders and the grinder will be reduced to a minimum.

The full nature of the invention will be understood from the accompanying drawings and the following description and claim:

In the drawings, Figure 1 is a plan view of a battery of lens grinding machines of the kind herein described operating from a single driving shaft, parts being broken away. Fig. 2 is a side elevation of one of the grinding machines shown in Fig. 1, with parts showing central vertical sections, the machine being in its position at the close of a grinding operation with the lens still in place. Fig. 3 is a section similar to the upper part of Fig. 2, showing the position of the parts of the lens holding mechanism when idle or when the lens is retracted from the grinder. Fig. 4 is a similar view showing the parts of the machine when it has moved the lens holder and blank to bring the blank in contact with the grinder and before grinding. Fig. 5 is similar to Fig. 4, with the stop in its adjusted position and with the stop gauge applied thereto, for setting the machine so that it will automatically grind away a predetermined thickness of the lens blank so as to provide the desired extent of grinding of the lens. Fig. 6 is similar to Fig. 5 with the stop gauge removed and the feed spring adjusted for yieldingly holding the lens against the grinder. Fig. 7 is a plan view of a part of the grinding wheel. Fig. 8 is a perspective view of a target bifocal lens blank such as is ground by this machine.

The bifocal lens grinding machine herein described is operated in batteries as illustrated in Fig. 1. By reason of the automatic operation of the lens holding mechanism after the lens has been mounted and said mechanism has been adjusted, one man is enabled to operate a great many machines or lens holding mechanisms, say sixteen in a battery, and to keep them all at work as will hereafter be explained.

There is a table 10 extending a full length of the battery of machines supported by a frame 11 of any suitable construction. In said frame under said table there is mounted a driving shaft 12 driven by means not shown, which shaft operates all of the grinding machines in the battery. The grinding machines are arranged in the battery, in groups of four each, one group being shown in Fig. 1, and for each group there is a sprocket chain 13 extending from a sprocket wheel (not shown) on the driving shaft 12 and extending vertically through openings 14 in the table to a sprocket wheel 15 mounted on a short shaft 16 which rotates the two grinders of each group, as shown in Fig. 1. This shaft 16 is parallel with the driving shaft 12 and is mounted in the bearing 17 carrying two bearing stands 18 that extend upward from the table 10, as shown in Fig. 2.

Near each end of said shaft 16 an abrasive grinding wheel 20 is mounted and clamped in place by the nut 21 bearing against the washer 22 and the collar 23 slidable on the shaft 16 and held thereon by the set screw 24. Hence, these grinding wheels have only one motion, that of rotation. Their circumferential surface is the grinding surface and it is shaped to grind multi-focal surfaces on lenses. The grinders 20 herein are shaped to grind bifocal lenses. A target lens blank 100 is ground on one side thereof to generate two concentric fields, a central or inner field 101 for near vision and a surrounding field 102 for distance vision, as seen in Fig. 8. This target blank after it has been ground is split centrally on the dotted line 103 to form a pair of semi-circular lens blanks of similar character from which a pair of lenses is afterwards cut along the dotted line 104. Therefore, the circumferential surface of the grinder 20 is shaped to have three zones extending around the grinder, one zone 121 being intermediate the other zones 122, and said zone having a width equal to the diameter of the reading field desired to be ground upon the center of the target lens blank 100, see Figs. 3 and 8. The zone 121 has a transverse curvature adapted to form the desired curvature of the reading field. The two lateral zones 122 have the same transverse curvature which, however, differs from the curvature of the zone 121 and is such as to generate the desired curvature of the distance field of the target blank.

The lens holding mechanisms of each group and the total battery are arranged in opposite pairs, as shown in Fig. 1, so that there is one lens holding mechanism on each side of each grinder and hence two lenses may be ground at the same time by the same grinder, but on opposite sides thereof. In grinding the lenses held by the two oppositely located lens holding mechanisms, the grinder grinds one lens on an upward movement and the other lens on a downward movement. The lens blanks are rotated on an axis at a right angle to the axis of the grinder and the radius of the grinder is much less than the radius of the curvature ground on the lens blank, as indicated in Fig. 2 so that only line grinding results, and not surface grinding.

A constant stream of water is preferably applied to the grinder both above and below each lens blank being ground, as shown by the nozzles 26 and 27 connected with the water pipe 28, as seen in Fig. 2.

The construction and operation of one of the lens holding mechanisms will now be described. There is mounted on the table 10 a frame 30 with two upwardly extending portions 31 and 32 having on their upper ends respectively the split housing 33 and the bearings 34 in which the spindle 35 is mounted. The tapering end of the spindle carries the lens block or holder 36. The split housing 33 carries within it a bearing sleeve 37. The parts are arranged so that the axis of the spindle 35 is at right angles to the axis of the shaft 16 on which the grinder is mounted and intersects said axis, as shown in Fig. 2, and the relative positions of these two axes are fixed and never change during the grinding operation.

The spindle 35 has rigidly secured on it a collar 38 near its inner end which is adapted to abut against and engage the end of the sleeve 37 when the parts are properly adjusted for operation. The spindle 35 is driven by the sprocket wheel 39 on the outer end thereof and the sprocket chain 40 thereon, which is driven by the counter-shaft 12 through intermediate gearing, not here shown, whereby all the mechanism of all the battery of grinders and lens holding mechanisms are operated from the same shaft 12.

The split housing 33 is tightened and clamped on the sleeve 37 after it has been adjusted by the clamping screw 41, which has an angular handle at the upper end. The sleeve 37 has a rack 42 on the under side extending longitudinally thereof, which is engaged by a pinion 43 on a shaft 44 mounted in the frame portion 31 and extending transversely of the sleeve 37 and the shaft 44 is turned by the hand wheel 45.

The lens block 36 has a shank with a tapered socket to fit on the tapered end of the spindle 35 as is usual in lens grinding machines. The face of the lens block may be of any form suitable to carry the lens blank which is cemented thereto by the bifocal lens blank which is usually relatively thin and can be molded to approximately the ultimate curvature of the surfaces of the lens blank after being ground and, therefore, the surface of the lens block on which the lens blanks in the machine, as shown in the drawings hereof, has a much greater radius of curvature vertically than the grinder, as seen in Figs. 3, etc.

The lens block and lens rotate, and the grinder and the lens block both rotate in the grinding operation on their axes, which are at right angles to each other and during the grinding operation these parts have no other motion. In this machine the peripheral curvature of the grinder is much greater than that of the lens surface to be generated, as indicated in the drawings, although the transverse curvature of the grinder is the same as the corresponding curvature of the surface to be generated on the lens blank. The result of this arrangement is that only the line grinding results and no surface grinding.

The idle position of the lens holding mechanism is shown in Fig. 3, wherein the lens does not touch the grinder. The first step in the adjustment of the lens holding mechanism, therefore, is to turn the hand wheel 45 clockwise so as to move the sleeve 37 on the spindle up against the collar 38, as seen in Fig. 4. Further movement of the hand wheel 45 and sleeve 37 to the right will move the spindle and lens holder so as to bring the lens blank against the grinder, as seen in Fig. 4. Then the housing 33 is tightened by turning the clamping rod 41 so that it will clamp the sleeve 37 and hold it in fixed position during the grinding operation.

The next step in the adjustment of the machine is to locate the stop 50 on the spindle 35 in proper relation to the outer end of the sleeve 37 so as to limit the grinding of the lens blank and prevent further grinding thereof after the desired thickness of the glass has been ground away, although the machine will continue to run. The stop 50 is clamped when adjusted on the spindle 33 by the screw 51. A gauge plate 52, which is of the same thickness as the amount of glass which it is desired to grind away from the lens blank, is provided and temporarily inserted against the outer end of the sleeve 37 and the stop 50 is moved up against such gauge plate, as seen in Fig. 5, and then tightened and the gauge plate removed. That leaves a space between the sleeve and the stop, as seen in Fig. 6.

The next step in the adjustment consists in adjusting the tension of the spring 55 surrounding the rod 56 which is loosely mounted in the ear 57 from the housing 33 and the ear 58 from the bearing 34. This spring at one end bears against the ear 58 and at the other end against a stop 59 which is adjustable on the rod 56 and tightened thereon by the screw 60. When the apparatus is idle or being adjusted, the stop 59 is loosened and rests then against the ear 57, as seen in Fig. 3. But, after the parts of the mechanism have been adjusted as heretofore described, the stop 59 is moved to the position shown in Fig. 6, so as to give the spring 55 sufficient tension to feed the lens holding means and the lens blank to the grinder. Thus the spring pushes to the right against the stop 59 and tends to push the rod 55 to the right and the outer end of said rod carries a forked or curved plate 61 that enters a recess 62 in the hub of the sprocket wheel 39 loosely. The parts are then in the position shown in Fig. 6 and are ready for the grinding of the lens blank to begin.

A housing member 63 extends upward from the frame and surrounds a part of the lens holding mechanism, as seen in Fig. 3.

It is to be remembered that the grinder is rotating all the time and when a lens holding mechanism is set, as shown in Fig. 6, with a space between the sleeve 37 and the stop 50 equal to the thickness of the glass desired to be ground, and the spring 55 through the intermediate mechanism is yieldingly forcing the spindle 35 and lens block and lens blank towards the grinder, and the lens is being rotated, the lens will be ground by this machine until the stop 52 engages the sleeve 37, as shown in Fig. 2. This stop automatically stops the advance or feeding movement of the spindle lens holder and lens blank towards the grinder so that no further grinding can take place, although the grinder is still rotating. After the lens blank has been ground, as shown in Fig. 2, the operator releases the spring stop 59 and thereby the tension of the spring 55 and then releases the clamp 41 and housing 33 and moves the lens holding mechanism away from the grinder far enough to remove the lens block and lens blank and to replace them with another lens block and lens blank to be ground. This is the idle position, as shown in Fig. 3.

One valuable feature of this lens holding mechanism is the stop 50 and associated parts which enable the machine to automatically grind the lens to the desired extent and without the attention of the operator. This enables one operator to manage a large number of lens holding mechanisms. He does not have to give any attention to the lens holding mechanism until after the lens blank has been ground, and he does not have to give attention then as soon as the grinding is finished, for the stop 50 will prevent any further or excessive grinding of the lens blank after it has beeen sufficiently ground, even if the operator does not give attention to the lens holding mechanism for some time after the lens blank has been ground sufficiently.

The quality of work of the mechanism, however, results chiefly from the line grinding and from the fact that the axes of both the grinder and the lens holder are fixed and relatively immovable and there is no chance of the slightest false movement of the lens blank and grinder during the grinding operation. This renders the grinding mechanically perfect as long as the grinding surface of the grinder is true and in order to do good work, it is necessary that it be kept true by being trued up, say, once a day, or whenever it is deemed necessary or desirable. The gage plate is not used in each operation for when the machine is once set, it may be operated for a considerable length of time, before a change in the adjustment may be required.

The invention claimed is:

A machine for grinding lenses including a rotary grinder, a lens holding spindle arranged to hold the lens against the grinder, a lens block on one end of the spindle, means for rotating the spindle, a collar on the spindle near the lens block, a frame having a bearing for the outer portion of the spindle, a split housing on said frame, a bearing sleeve in said housing having a rack on the underside thereof and in which the inner portion of the spindle is rotatably mounted, means engaging the rack for longitudinally moving the sleeve when the housing is not clamped, whereby the sleeve may be moved inward against the collar in order to move the spindle to working position preliminary to the grinding operation and withdrawn after the grinding operation, means for clamping the housing, and yielding means for urging the spindle towards the grinder.

In witness whereof, I have hereunto affixed my signature.

LUCIAN W. BUGBEE.